United States Patent
Progl et al.

[11] Patent Number: 5,847,925
[45] Date of Patent: Dec. 8, 1998

[54] SYSTEM AND METHOD FOR TRANSFERRING HEAT BETWEEN MOVABLE PORTIONS OF A COMPUTER

[75] Inventors: Curtis L. Progl, Montgomery; Mark S. Tracy; David A. Moore, both of Tomball, all of Tex.

[73] Assignee: Compaq Computer Corporation, Houston, Tex.

[21] Appl. No.: 908,117

[22] Filed: Aug. 12, 1997

[51] Int. Cl.⁶ .............................. G06F 1/20; H05K 7/20
[52] U.S. Cl. .................... 361/687; 165/85; 165/104.33; 174/15.2
[58] Field of Search ................... 361/687–689, 361/700, 704; 364/708.1; 165/86, 104.33; 174/15.2; G06F 1/16

[56] References Cited

U.S. PATENT DOCUMENTS

| | | | |
|---|---|---|---|
| 4,194,559 | 3/1980 | Eastman | 165/105 |
| 4,196,504 | 4/1980 | Eastman | 29/157.3 R |
| 4,248,295 | 2/1981 | Ernst et al. | 165/105 |
| 4,274,479 | 6/1981 | Eastman | 165/104.26 |
| 4,345,642 | 8/1982 | Ernst et al. | 165/86 |
| 4,408,661 | 10/1983 | Eastman et al. | 165/164 |
| 4,547,130 | 10/1985 | Eastman | 417/53 |
| 4,565,243 | 1/1986 | Ernst et al. | 165/104.26 |
| 4,603,731 | 8/1986 | Olsen | 165/41 |
| 4,683,940 | 8/1987 | Ernst et al. | 165/32 |
| 4,696,010 | 9/1987 | Eastman | 372/34 |
| 4,697,205 | 9/1987 | Eastman | 357/82 |
| 4,729,061 | 3/1988 | Brown | 361/386 |
| 4,789,026 | 12/1988 | Shank et al. | 165/104.26 |
| 4,799,537 | 1/1989 | Hoke, Jr. | 165/32 |
| 4,807,697 | 2/1989 | Gernert et al. | 165/104.26 |
| 4,815,528 | 3/1989 | Shaubach et al. | 165/104.26 |
| 4,854,379 | 8/1989 | Shaubach et al. | 165/104.26 |
| 4,879,632 | 11/1989 | Yamamoto et al. | 361/386 |
| 4,880,052 | 11/1989 | Meyer, IV et al. | 165/104.14 |
| 4,917,177 | 4/1990 | Gernert | 165/104.26 |
| 4,941,527 | 7/1990 | Toth et al. | 165/47 |
| 5,002,122 | 3/1991 | Sarraf et al. | 165/104.26 |
| 5,060,114 | 10/1991 | Feinberg et al. | 361/387 |
| 5,076,352 | 12/1991 | Rosenfeld et al. | 165/104.26 |
| 5,115,225 | 5/1992 | Dao et al. | 340/584 |
| 5,142,442 | 8/1992 | Daniels et al. | 361/384 |
| 5,159,529 | 10/1992 | Lovgren et al. | 361/385 |
| 5,168,919 | 12/1992 | Berenholz et al. | 165/80.4 |
| 5,181,167 | 1/1993 | Davidson et al. | 361/385 |
| 5,185,691 | 2/1993 | Korinsky | 361/386 |
| 5,190,099 | 3/1993 | Mon | 165/104.33 |

(List continued on next page.)

OTHER PUBLICATIONS

A generally rectangular-shaped heat transfer vessel having curved corners for use in a portable computer developed by Thermacore, Inc. referred to in the Background of Invention of the present application.

(List continued on next page.)

*Primary Examiner*—Lynn D. Feild
*Attorney, Agent, or Firm*—Pravel Hewitt & Kimball

[57] ABSTRACT

A computer includes a flexible member or tube fabricated from thermally conductive carbon fibers for transferring heat from a first portion, such as a base section of a portable computer, to a second portion, such as the display section of a portable computer, where the sections of the computer move between an open operating position and a closed position. The flexible member, fabricated from conductive fibers, is positioned so as to experience torsion upon opening the portable computer. A first heat pipe is thermally connected with a microprocessor in the base section at one end and at the other end is coaxially attached within the member or tube. A second heat pipe is similarly coaxially attached to the other end of the member or tube. The other end of the second heat pipe is positioned within the display section between the LCD screen and the back surface of the portable computer with an aluminum center tab attached to the second heat pipe for dissipating heat from the microprocessor to the back surface of the display section of the portable computer. Advantageously, a method for transferring heat between movable portions of a computer is disclosed.

28 Claims, 2 Drawing Sheets

U.S. PATENT DOCUMENTS

| | | | |
|---|---|---|---|
| 5,199,487 | 4/1993 | DiFrancesco et al. | 165/168 |
| 5,199,888 | 4/1993 | Condra et al. | 439/142 |
| 5,258,888 | 11/1993 | Korinsky | 361/704 |
| 5,285,108 | 2/1994 | Hastings et al. | 257/712 |
| 5,311,448 | 5/1994 | Waggoner et al. | 364/578 |
| 5,329,996 | 7/1994 | Rosenfeld | 165/168 |
| 5,390,734 | 2/1995 | Voorhes et al. | 165/185 |
| 5,397,176 | 3/1995 | Allen et al. | 312/223.2 |
| 5,491,611 | 2/1996 | Stewart et al. | 361/736 |
| 5,495,978 | 3/1996 | Muth | 228/122.1 |
| 5,511,306 | 4/1996 | Denton et al. | 29/840 |
| 5,549,155 | 8/1996 | Meyer et al. | 165/104.33 |
| 5,566,752 | 10/1996 | Arnold et al. | 165/185 |
| 5,621,613 | 4/1997 | Haley et al. | 361/687 |
| 5,709,960 | 1/1998 | Mays et al. | 428/698 |
| 5,737,187 | 4/1998 | Nguyen et al. | 361/704 |

OTHER PUBLICATIONS

Jun. 4, 1997 printout from the Internet http://www.thermacore.com techno.htm entitled "Heat Pipe Technology The Heat Pipe—How it works", 2 pages(prior art).

Manufacturing Engineering and Technology by Serope Kalpakjian, entitled "17.4 Sintering" ©1989 by Addison–Wesley Publishing Company, pp. 509–510, 4 pages.

Elements of Materials Science and Engineering Third Edition by Lawrence H. Van Vlack entitled "13–1 Agglomerated Materials" for sintered products, ©1975 Addison–Wesley Publishing Company, Inc., pp. 441 to 451, 13 pages.

Thermacore, Inc. Edge Fin Type and Center Fin Type (one page) (prior art).

Printout performed Apr. 30, 1997 of all "Thermacore" patents, pages 1–46 (A number of these patents were selected and listed above).

McGraw–Hill Encyclopedia of Science & Technology 5th Edition ©1982 McGraw–Hill, Inc., entitled "Sintering", p. 437 (3 pages).

May 21, 1997 Printout from the Internet–http://www.thermacore.com/ entitled "Thermacore, Inc. . . . The Leaders in Heat Pipe Technology", ©1996 Thermacore, Inc., pp. 1 of 1 and pp. 1 to 4, 5 pages.

Introduction to Mechanics of Solids by Egor P. Popov, ©1968 by Prentice–Hall, Inc. Englewood Cliffs, N.J., Chapter 5 entitled "Torsion" pp. 143–176, 36 pages.

Brochure entitled "Compaq Notebooks Your Business is Always Moving Forward. It's Time You Had a Notebook That Stays One Step Ahead". ©1996 Compaq Computer Corporation, All Rights Reserved, 12 pages.

Letter dated May 29, 1997, from John P. Jennings, Vice President of Sales of Cema Technologies, Inc. of Bridgeport, Pennsylvania to Curt Progl of Compaq Computer Corporation proposing a hinge for connecting heat pipes in the display section and base section of a portable computer, 3 pages.

Facsimile dated Jan. 23, 1997, from David Lowry, President Cema Technologies, Inc. of Bridgeport, Pennsylvania to Curt Progl of Compaq Computer Corporation proposing a hinge for connecting heat pipes in the display section and base section of a portable computer, 2 pages.

Printed publication entitled "Characteristics of a Heat Pipe with Carbon Fiber Wick" by Akihiro Shimizu and Shinichiro Yamazaki of Tokyo National College of Technology, Japan and Masataka Mochizuki of Fujikura, Ltd. of Japan, pp. 483 to 488, 6 pages.

One page product information sheet for Developmental Product Thermalgraph ® Fabric EWC–600X, by Amoco Performance Products, Inc. USA, revised May 29, 1996.

Jun. 4, 1997 printout of AI Technology Homepage–http://www.aitechnology.com/index.html, including description of AIT Product EG 7658–5–SM21 Thermosetting Flexible Epoxy, 2 pages.

Document entitled "Thermally Conductive Plastics" Compaq/Amoco Discussion Meeting, Houston, Texas Jan. 14, 1997, 26 pages.

"Thermal Modeling of Grease–Type Interface Material in PPGA Application" by Chia–Pin Chiu, Gary L. Solbrekken and Yoke D. Chung of Intel Corporation of Chandler, Arizona, pp. 57–63 (8 pages), presented in the Thirteenth Annual IEEE Semiconductor Thermal Measurement and Management Symposium held in Austin, Texas Jan. 28–30, 1997.

"Hinged Heat Pipes for Cooling Notebook PCs" by Masataka Mochizuki, et al. of Fujikura Ltd of Tokyo, Japan and Fujikura America, Inc. of Santa Clara, California, pp. 64–72 (10 pages), presented in the Thirteenth Annual IEEE Semiconductor Thermal Measurement and Management Symposium held in Austin, Texas Jan. 28–30, 1997.

"An Experimental Study of Forced Convection Heat Transfer From In–Line Pin Fin Arrays," by Vinod K. Maudgal of Phillips Technologies of Cambridge, MD and J.E. Sunderland of the Dept. of Mechanical Engineering, University of Massachusetts, Amherst, Massachusetts, pp. 149–157 (10 pages), presented in the Thirteenth Annual IEEE Semiconductor Thermal Measurement and Management Symposium held in Austin, Texas Jan. 28–30, 1997.

"Characterization of Longitudinal Fin Heat Sink Thermal Performance and Flow Bypass Effects Through CFD Methods" by Adam V. Barrett, Thermalloy Inc. of Dallas, Texas and Izundu F. Obinelo, Maya Heat Transfer Technologies, Ltd. of Montreal, Quebec Canada, pp.158–164 (8 pages), presented in the Thirteenth Annual IEEE Semiconductor Thermal Measurement and Management Symposium held in Austin, Texas Jan. 28–30, 1997.

In early 1997, an Amoco employee advised Mark S. Tracy, one of the named inventors, that a pitch–fiber based high thermal conductivity woven fabric in a plastic sleeve was used for transferring heat between a door and a housing of a satellite. The ends of the fabric were believed to be attached to conductive metal portions of the door and housing by epoxy. Applicant has a six inch piece of this fabric in the sleeve given to Mark Tracy from Amoco in early 1997. If the examiner would like to inspect this Amoco fabric/sleeve, please contact the undersigned. See Items T and V above.

SYSTEM AND METHOD FOR TRANSFERRING HEAT BETWEEN MOVABLE PORTIONS OF A COMPUTER

BACKGROUND OF THE INVENTION

1. Field of the Invention

The invention relates to a system for cooling an electronic component using a heat transfer member, and more particularly, a system for transferring heat between movable portions of a computer and a method of transferring the heat.

2. Description of the Related Art

Heat dissipation continues to be an omnipresent concern in high performance electronic system design Most electronic systems, including computer systems, generate heat caused by current flow and/or transistor switching. The faster and more powerful electronic systems, of course, generate more heat. That is, for example, a faster computer performs more operations in a given amount of time and switches more transistors thereby drawing more power and radiating more heat. It is well known that according to the Arrhenius equation, there is an exponential increase in failure rates with incremental increases in operating temperatures. For example, assuming a 1.0 eV activation energy in a microprocessor, the failure rate doubles for every 10° rise in operating temperature.

The assignee of the present invention, Compaq Computer Corporation, has addressed these concerns of heat generating electronic components in the past, as proposed in U.S. Pat. Nos. 5,115,225; 5,142,442; 5,185,691; 5,258,888; 5,285,108; 5,311,448; 5,511,306; and U.S. patent application Ser. Nos. 08/034,095 to Thome filed Mar. 22, 1993; 08/775,143 to Donahoe et al. filed Dec. 31, 1996; 08/856,020 to Mecredy filed May 14, 1997 and 08/882,360 to Mecredy filed Jun. 25, 1997, entitled "System for Cooling a Computer Using a Heat Transfer Vessel and Method of Forming the Vessel." All of the above U.S. patents and patent applications are incorporated herein by reference for all purposes.

Initially, dissipating microprocessor heat in computer systems was an important but relatively easily solved problem. Although most desktop computer microprocessors initially generated more than enough heat to damage or destroy the microprocessor, the heat could be safely dissipated with a well-designed ventilated enclosure using a passive heat sink.

However, some of the latest microprocessors consume much more power and dissipate much more heat than a heat sink can properly handle. In particular, the microprocessor sold under the trademark PENTIUM owned by Intel Corporation is notorious for generating enough heat to destroy both the microprocessor and surrounding electronic components on the circuit board onto which it is attached. So much heat is generated by the PENTIUM microprocessor that it cannot be properly dissipated by a passive heat sink, even in desktop computer system enclosures. Consequently, a fan, using rotating fluid-dynamic surfaces or blades, is often provided near the PENTIUM microprocessor to help dissipate the heat and keep the microprocessor properly cooled. Generally, since a desktop computer system is usually packaged with significant elevation differences and relatively large, unrestricted air passages, providing a properly sized fan system in combination with a heat sink in the desktop computer system efficiently dissipates the microprocessor heat.

However, the concern of these latest high heat generating microprocessors becomes more acute when used in portable computers, of the type known as laptop, notebook and subnotebook computers. In particular, the dense packaging of portable computers does not provide either significant elevation differences to produce a desired "chimney" effect or the relatively large, unrestricted air passages needed to provide proper natural convection.

Heat pipe technology has recently been adapted for use in the portable computer industry. Originally, heat pipe technology was used in the aerospace program that required larger heat pipes. Some companies involved in the development of heat pipe technology are Thermacore, Inc. of Lancaster, Pa.; Fujikura America, Inc. of Atlanta, Ga. with its head office of Fujikura, Ltd. of Tokyo, Japan; Furukawa Electronic Co., Ltd. of Tokyo, Japan; and Wakefield Engineering of Wakefield, Mass. The conventional heat pipe is a vacuum-tight tubular pipe, generally fabricated from copper, that is partially filled with a minute amount of water, less than 1 cc, or other working fluid and evacuated. As heat is directed into the pipe, the fluid is vaporized creating a pressure gradient in the pipe. This forces the vapor to flow along the pipe to a cooler section where it condenses, giving up its latent heat of vaporization. The working fluid is then returned to the evaporator section by either capillary forces developed in the heat pipes porous wick structure, gravity, or a combination of both. U.S. Pat. No. 4,683,940 proposes the effects of gravitation of a tilted heat pipe and centrifugal force on a heat pipe. Some known wicking structures are sintered copper powder, metallic screen, longitudinal grooves or organic fiber applied on the interior surface of the tubular pipe. Also, Fujikura, Ltd. has proposed a heat pipe with a carbon fiber wick.

Thermacore, Inc. has proposed a HS-NB series of tubular heat pipes specifically designed for PENTIUM microprocessor notebook computers. One end of the heat pipe is stated to be attached to a microprocessor with a thin, clip-on mounting plate. The other end of the heat pipe is stated to be attached to a heat sink, such as a specially designed keyboard RF shield. Generally, the diameter of the heat pipe can range from 3 mm to 5 mm. While tubular heat pipes can be partially fitted to planar geometries by slight flattening, the amount of flattening would be limited so as not to damage the vapor channel or working fluid flow path.

More recently, Thermacore, Inc. has developed a generally rectangular-shaped heat transfer vessel having curved comers for use in a portable computer. This device is approximately 3"×5" and ⅛" to ¼" thick. The base and cover are separately stamped components that are believed to be sealed by solder. Only one surface, the 3"×5" base or cover of this two piece stamped device, includes a uniform wicking structure of sintered copper powder. It is believed that the flow of heat was designed to move from one of the 3"×5" face areas to the other 3"×5" face area.

Thermacore, Inc. has also offered edge and center fins or tabs for use with its conventional tubular heat pipe. U.S. Pat. No. 4,917,177 proposes the use of cooling fins 24 attached to an extension 16, which is in turn, is attached to a heat pipe 11.

Known commercially available portable computers using the tubular heat pipes for thermal control include the IBM ThinkPad 760 ED and Toshiba Tecra 740 CDT. Also, the assignee of the present invention, Compaq Computer Corporation, has used a conventional tubular heat pipe in a COMPAQ ARMADA 4100 Series notebook computer, in its assembly PN 287245 for cooling electronic components. The 4100 series has a die-cast magnesium alloy structural frame. One main board and one CPU circuit board are housed, as well as components such as a removable hard-disk drive, a removable floppy disk drive and PC card sockets, in the computer. Of particular concern, is the microprocessor positioned on the CPU circuit board. A thermal interface material with adhesive on each side, such as provided by Thermagon, Inc. of Cleveland, Ohio, is attached to the top of the microprocessor and a bottom surface of an edge tab. U.S. Pat. No. 5,285,108, assigned to the assignee of the present invention, proposes the use of a flexible, electrically non-conductive, thermally conductive interface material, such as sold under the trademark CHO-THERM by Chomerics, Inc. of Woburn, Mass. The tab is attached by a "thermal" epoxy to a 3 mm diameter heat pipe. The heat pipe has a bend in its mid section to transfer heat from the microprocessor to a custom heat sink in the base section, sometimes referred to as a radiator hump, located on the rear of the base section below, but not on, the display section. The radius of the bend is approximately 7.5 mm to avoid buckling, which restricts the vapor path of the tubular pipe and/or damages the wick structure of copper sintered powder on the interior surface of the pipe that would affect the working fluid path.

U.S. Pat. No. 4,345,642 has proposed a multiple section heat pipe with a swivel junction between the sections. The individual sections are independent individual heat pipes configured to interlock with each other at rotatable joints filled with high heat conductivity liquid. Col. 3, Ins 1–23, of the '642 patent proposes the use of a thermally conductive fluid in the gap between the adjacent surfaces of the heat pipe and reentrant cavity to conduct heat. In particular, fluids, such as liquid metals, metal alloys with low melting points, water, grease, cesium mercury, alloy of sodium and potassium are proposed.

In January of 1997, a printed publication entitled "Hinged Heat Pipes for Cooling Notebook PCs" was presented at the Thirteenth IEEE "SEMI-THERM" Symposium in Austin, Tex. by Fujikara, Ltd of Tokyo, Japan, and Fujikura America, Inc. of Santa Clara, Calif. Also, page 72 of the printed publication refers to a "CPU Cooling by Using Hinge Pipe", 33rd National Heat Transfer Symposium of Japan, 1996, Niigata. This 1997 Fujikura printed publication proposes a system that take the heat away from the central processing unit "CPU" and dissipates it to the back of the display screen (LCD) via means of heat pipes and a hinged connector. As illustrated and disclosed on pages 66 and 67 of the 1997 printed publication, the hinged heat pipe system consists of two heat pipes and a hinged connector. The first heat pipe (or primary heat pipe) is stated to be fixed and is in contact with the CPU to transfer the CPU's heat to a second heat pipe (or secondary heat pipe) via a hinged connector proposed to join the two heat pipes together. As illustrated, the secondary heat pipes is stated to be used to transfer heat onto an aluminum plate, which is placed at the back of the LCD. The hinged connector, illustrated in FIG. 4(c) on page 67, has one slot for the primary heat pipe and another slot for the secondary heat pipe. Furthermore, the hinged connector is stated on page 67 to have a dimensions of 40×15.2×8 mm and fabricated from copper C1020. Finally, as discussed in the last paragraph of page 69, while tests were conducted with and without using thermal grease in the connector, it was concluded at the bottom of the first column of page 71 that heat pipes can be implemented into existing hinges of notebooks PCs without having to use thermal grease.

Cema Technologies, Inc. of Bridgeport, Pa. has also proposed a hinged connection between two heat pipes. Also, the primary heat pipe is connected to the microprocessor by a tab in the base section and the secondary pipe rotates in the hinge and is connected to a copper flag in the display section.

However, it would be desirable to provide a device to transfer heat between two moving portions of a computer that would weigh less than a copper or another metal hinge block, without use of thermal grease and would eliminate wear, particularly frictional wear, stress, and fatigue to the mating ends of conventional heat pipes while providing high thermal interface reliability.

SUMMARY OF THE INVENTION

A computer includes a flexible member or tube fabricated from thermally conductive carbon fibers for transferring heat from a first portion, such as a base section of a portable computer, to a second portion, such as the display section of a portable computer, where the sections of the computer move between an open operating position and a closed position. The flexible member, fabricated from conductive fibers, is positioned so as to experience torsion upon opening the portable computer. A first heat pipe is thermally connected with a microprocessor in the base section at one end and at the other end is coaxially attached within the member or tube. A second heat pipe is similarly coaxially attached to the other end of the member or tube. The other end of the second heat pipe is positioned within the display section between the LCD screen and the back surface of the portable computer with an aluminum center tab attached to the second heat pipe for dissipating heat from the microprocessor to the back surface of the display section of the portable computer. Advantageously, a method for transferring heat between movable portions of a computer is disclosed.

BRIEF DESCRIPTION OF THE DRAWINGS

The objects, advantages and features of the invention will become more apparent by reference to the drawings which are appended hereto, wherein like numerals indicate like parts and wherein an illustrated embodiment of the invention is shown, of which.

DETAILED DESCRIPTION OF THE PREFERRED EMBODIMENT

Figure 1:
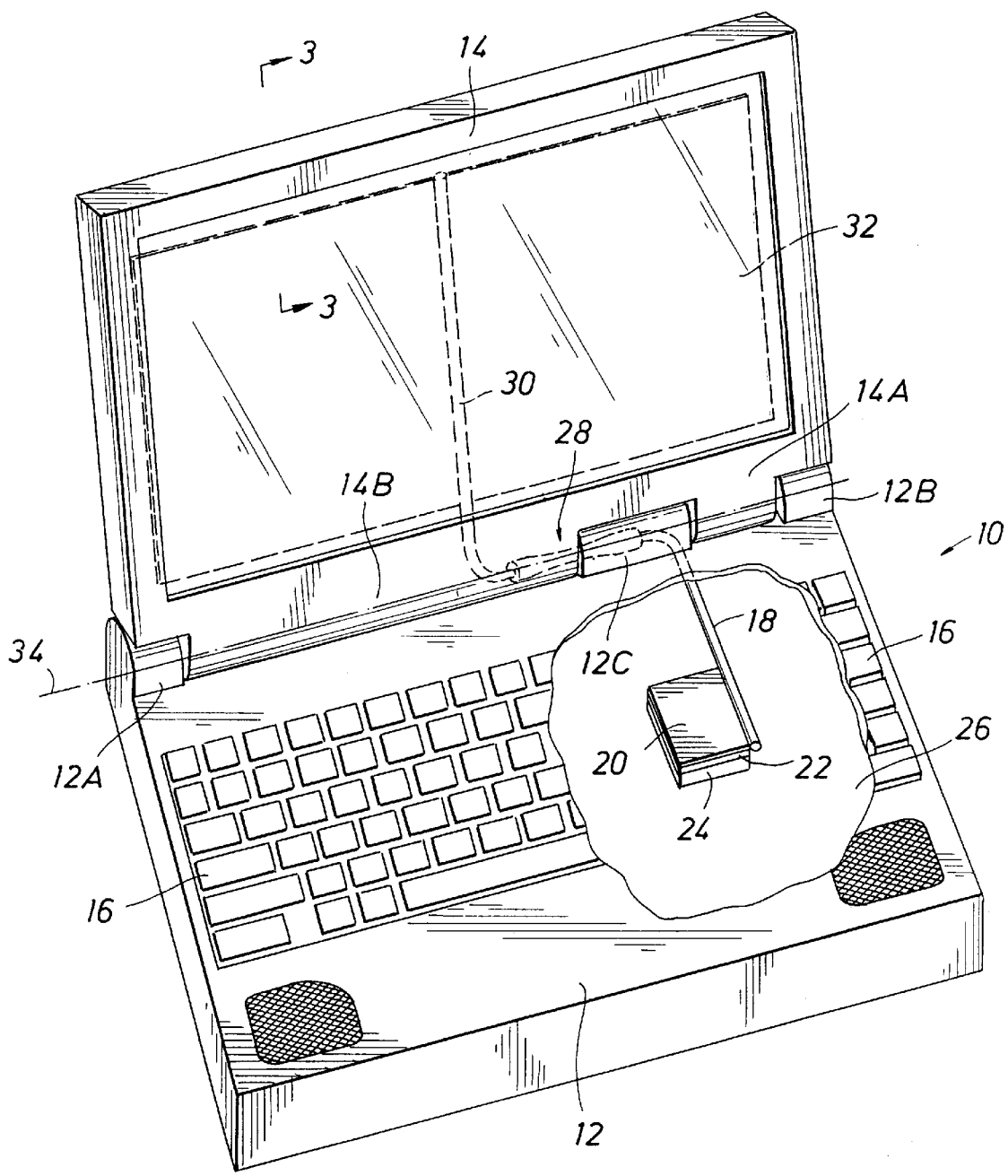
FIG. 1 is a perspective view of a portable computer using the heat transfer system of the present invention.
Figure 2:
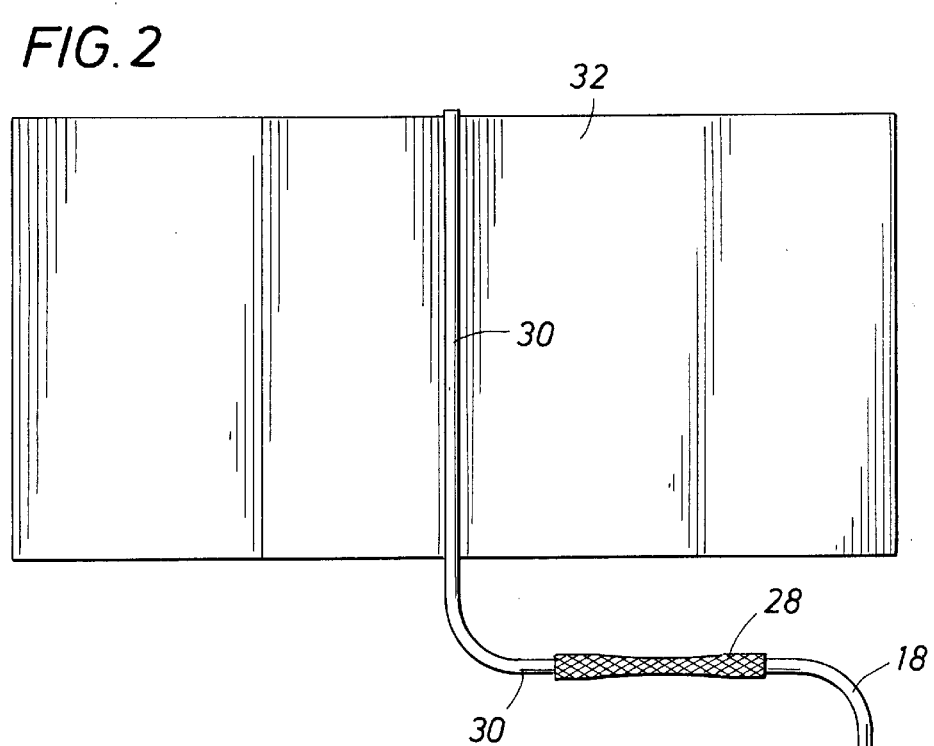
FIG. 2 is a plan view of the heat transfer system of the present invention.
Figure 3:
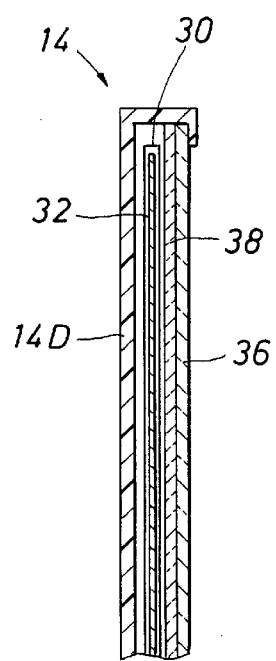
FIG. 3 is a section view of the display section of the portable computer taken along line 3—3 of FIG. 1 showing the positioning of the thermally conductive tab and a second heat pipe in the display section.

Turning now to the drawings, the system for transferring heat between movable portions of a computer is illustrated in FIGS. 1 to 4. In particular, a portable computer, generally indicated at 10, is shown in FIGS. 1 and 3 and includes a base section 12 and a display section 14. The display section 14 is pivotable between an open position, as shown in FIG. 1, and a closed position where the display section 14 is parallel to the base section 12, such as illustrated in FIG. 1 of U.S. Pat. No. 5,682,290 to Markow et al. filed Mar. 1, 1996, which is assigned to the assignee of the present invention and incorporated herein by reference for all purposes.

While the present invention is shown used in a portable computer 10, it is to be understood that the present invention could be used with a computer tower unit system, such as disclosed in U.S. Pat. Nos. 5,397,176 and 5,491,611 or in an enclosure of a desktop computer system or notebook configurations, such as shown in U.S. Pat. No. 5,199,888 or in any other electronic equipment. U.S. Pat. Nos. 5,199,888; 5,397,176; and 5,491,611 assigned to the assignee of the present invention, are incorporated herein by reference for all purposes. Though one preferred embodiment is disclosed, it is to be understood that the "preferred" embodiment for a particular computer or component will depend on a number of variables, such as the microprocessor or heating generating member used, space requirements, cost, frame structure, outer surface area, etc.

In particular, a portion of the keyboard having the plurality of keys 16 in base section 12 is shown broken away to better illustrate the first heat pipe 18 having an edge tab 20 fixedly positioned in the base section 12. The bottom surface of the tab 20 is connected to a thermal interface material 22, such as sold under the trademark CHO-THERM by Chomerics, Inc. of Woburn, Mass. This thermal interface material 22 preferably has adhesive on both sides for securing the tab 20 to the microprocessor 24, such as a microprocessor sold under the trademark PENTIUM owned by Intel Corporation. The microprocessor 24 is, in turn, secured to a printed circuit board 26, as is known by those skilled in the art. The other end of the first heat pipe 18 is coaxially attached to a flexible member or tube, generally indicated at 28, as will be described below in detail. A second heat pipe 30 is coaxially attached to the other end of the flexible member 28 and extends upwardly, when in the open operating position shown in FIG. 1, for connection to a center tab 32, preferably fabricated from aluminum, that is positioned in the display section 14 of the portable computer 10. The second heat pipe 30 is fixedly positioned in the display section 14. Both the first heat pipe 18 and the second heat pipe 30 are preferably conventional heat pipes, such as sold by Thermacore, Inc., having a copper housing and a sintered copper powder wick structure.

Figure 4:
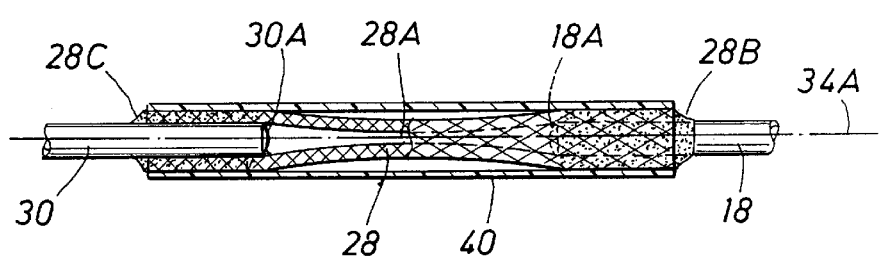
FIG. 4 is a section view of the flexible member or tube and sleeve of the present invention attached between a first heat pipe and the second heat pipe in a non-torqued position.

As can be seen, in FIG. 1, the display section 14 is hinged to the base section 12 along the axis 34. As best seen in FIG. 4, the longitudinal axis 34A of the flexible member 28 is coaxial with the axis 34. Additionally, clutch members, as is known by those skilled in the art, are located in upwardly extending humps 12A and 12B of the base section 12 of the portable computer 10 and an end portion of the first heat pipe 18 and approximately half of the tube 28 is located in tab 12C of the base section 12. The downwardly extending hump 14A and elongated downwardly extending tab 14B of display section 14 include conventional components to pivotably attach the display section 14 to the base section 12. As can be seen, an end portion of the second heat pipe 30 and approximately half of the tube 28 is located in the elongated downwardly extending tab 14B of display section 14.

Returning now to FIG. 3, the display section 14 is shown in partial section view and includes an LCD screen 36 in the front of the display section 14, as is known by those skilled in the art. Between the second heat pipe 30 and the center tab 32 and the screen 36 is an insulation material 38, preferably a polyetherimide film sold under the trademark ULTEM by General Electric Co., to reduce heat transfer from the heat pipe 30 and tab 32 to the screen 36. The typical properties of this polyetherimide film is an amber transparent matte/gloss finish, 200° C. service temperature, dielectric strength at 2 Mils 7,000 volts, extremely high tensile strength, dimensionally stable, and UL94 V-0 flammability. However, as can be seen in FIG. 3, no material is provided between the heat pipe 30 and center tab 32 and the back 14D of the display section 14 thereby facilitating heat transfer from the tab 32 to the back 14D of the display section 14, particularly when the portable computer 10 is in its open operating position, as shown in FIG. 1. As can be best seen in FIGS. 1 and 3, heat is moved away from the microprocessor 24 through the heat pipes 18, 30 via the flexible tube 28 to the back 14D of the display section 14.

Turning now to FIG. 2, the heat transfer system including the first 3 mm diameter heat pipe 18 is shown in a broken view with edge tab 20 preferably attached to one end of the first heat pipe 18 by a conventional "thermal" epoxy. The other end of the heat pipe 18 is coaxially attached to the flexible material 28, as will be described below in detail. Additionally, one end of the second heat pipe 30 is attached to the center tab 32, preferably by thermal epoxy or crimping. The other end of the heat pipe 30 is coaxially attached to the other end of the flexible member 28, as will be described below in detail. Though the preferred embodiment of the flexible member 28 is coaxially attached, alternatively, the member 28 could be crimped along side the heat pipes 18, 30 using a metal band (not shown). The radius of the bend in heat pipes 18, 30 is approximately 7.5 mm to avoid buckling.

Turning now to FIG. 4, an enlarged section view of the flexible member or tube 28, fabricated from a pitch-fiber based high thermal conductivity woven fabric, is shown. The ends of the hollow flexible member or tube 28 are open to allow insertion of the end 30A of second heat pipe 30, and end 18A of heat pipe 18. As can be seen, the tube 28 is free to torque about center line 28A, between a first portion of a computer, such as the base section 12, and a second portion of the computer, such as the display section 14, when the portable computer 10 is moved between a closed position and an open operating position.

Preferably, the hollow flexible member or tube 28 is fabricated from a fabric sold under the trademark THERMALGRAPH having product number EWC-600X and is sold by Amoco Performance Products, Inc. The THERMALGRAPH fabric is a pitch-fiber based high thermal conductivity woven fabric developed for thermal management applications. Due to the orthotropic nature of the weave, and the high longitudinal thermal conductivity of the fibers, Amoco states that biaxial thermal conductivity is achieved. This product is stated to be easily prepregged and processed into a composite form. EWC-600X is available as an eight harness satin weave fabric constructed of 2000 (2K) filament continuous pitch tows. Some of the other preliminary properties of this developmental fabric provided by Amoco Performance Product, Inc. are as follows:

| Preliminary Properties | |
|---|---|
| Fabric Properties | |
| Weave* | 8 Harness Satin |
| Count (Warp & Fill) | 20 × 20 tows/in. |
| Width | 35 in. (89 cm) |
| Weight | $491 \frac{g}{M^2} \left(14.5 \frac{oz}{yd^2}\right)$ |
| Thickness | 0.84 mm (0.033 in.) |
| Fabric Electrical Resistivity (Warp & Fill) | $0.04 \frac{\Omega}{sq}$ |

-continued

Preliminary Properties

Yarn Properties

| | |
|---|---|
| Density | 2.18 g/cc |
| Carbon Assay | >99% |
| Yarn Electrical Resistivity | 1.9–2.5 $\mu$-$\Omega$-m |
| Estimated Thermal Conductivity | 550–650 $\frac{W}{m°K}$ |
| Filament/Strand | 2000 |
| Surface Treatment | None |
| Size | None |

Composite Thermal Conductivity

| | |
|---|---|
| @60% V$_f$ (Cyanate Matrix) (Warp & Fill) | 180 $\frac{W}{m°K}$ |

*Other filament counts and fabric styles can be provided on special order.

A thermally conductive material is used to attach the flexible material 28 to the heat pipes 18, 30. This material must have a high thermal conductivity and provide a good thermal connection to the ends of the pipes 18, 30. Preferably, this material would be solder. Alternatively, a thermal conductive epoxy can be used, such as the thermal setting flexible epoxy provided by AI Technology, Inc. of Lawrenceville, N.J. having AIT Product No. EG 7658-5-SM21 which specifications provide for thermal conductivity, a cross linking with heat cure, and displacement and dispenser processing. The preferable solder connection 28C and 28D is best shown in FIG. 4 and extends substantially from the end 30A of pipe 30 to the outer end of the sleeve 40 about pipe 30 and substantially from the end 18A of pipe 18 to the outer end of the sleeve 40 about pipe 18. Additionally, the hollow thin-walled sleeve 40, though not shown in FIGS. 1 and 2, preferably covers the tube 28 to both protect the tube 28 and to contain any stray carbon fibers from the tube 28. Preferably, the sleeve 40 is fabricated from a material having a high modulus of elasticity to withstand repeated flexing, such as a nylon resin sold under the trademark ZYTEL, supplied by E. I. Dupont De Nemours & Co. While the sleeve 40 is preferably attached to both heat pipes 18, 30, alternatively, the hollow thin-walled sleeve 40 could be only attached to one heat pipe and free to rotate about the other heat pipe.

METHOD OF USE

As can now be seen, the components for the method of transferring heat from a first portion of a computer to a second portion of a computer, where the first portion moves relative to the second portion are disclosed.

The method comprises moving the display section 14 of the portable computer 10 to an open operating position relative to the base section 12 of the computer 10. Upon moving the display section 14, the flexible tube 28 is torqued. Because the ends of tube 28 are fixed to the pipes 18, 30 and the sleeve 40 by solder, as discussed, the majority of the torquing occurs between the ends 18A and 30A of their respective heat pipes 18, 30. While tube 28 and sleeve 40 are in the torqued position, heat can be transferred from the microprocessor 24 in the base section 12 via the thermal interface material 22 to the tab 20 which heat is, in turn, transferred by the first heat pipe 18 through the tube 28 to the second pipe 30. The second pipe 30 then disburses the heat across the aluminum center tab 32 to allow the heat to dissipate in the ambient air, as the display section 14 is in the open operating position, as shown in FIG. 1. Though heat could dissipate to the air when the display section 14 is in the closed position, most heat is generated in the base section 12 of the computer 10 when the display section 14 is in the operating position. As stated above, preferably the hollow thin-walled sleeve 40 surrounding the flexible tube 28 is attached at both ends to the first heat pipe 18 and the second heat pipe 30 and the ends of the tube 28. Therefore, upon torquing the flexible tube 28, the hollow thin-walled sleeve 40 will also deform. Upon moving the display section 14 to its closed position, the hollow thin-walled sleeve 40 and the flexible tube 28 are returned to their memory position, as shown in FIG. 4. The memory position is defined as allowing the sleeve 40 and tube 28 to fully recover to their original shape after being subjected to deforming force which twists the sleeve 40 and tube 28 through pivoting of the display section 14 between the open and closed position relative to the base section 12 without exceeding the elastic limits of the sleeve 40 or tube 28. It is preferred that the distance of the flexible tube 28 and the hollow thin-walled sleeve 40 is approximate 1½ to 2 inches between the ends 18A and 30A of the respective heat pipes 18, 30 to withstand repetitive torquing through at least an angle of 120°.

The foregoing disclosure and description of the invention are illustrative and explanatory thereof, and various changes in the size, shape, materials, components, circuit elements, wiring, connections and contacts, as well as in the details of the illustrated apparatus and construction and method of operation may be made without departing from the spirit of the invention.

What is claimed is:

1. Apparatus for transferring heat, comprising
   a first heat pipe,
   a second heat pipe, and
   a flexible member having a longitudinal axis and fabricated from thermally conductive fibers, said flexible member attached between said first heat pipe and said second heat pipe, said member being torqued about its longitudinal axis upon rotation of one of said heat pipes.

2. Apparatus of claim 1 wherein said first heat pipe has a housing fabricated from copper and a wicking structure disposed within said housing.

3. Apparatus of claim 2 wherein said second heat pipe has a housing fabricated from copper and a wicking structure disposed within said housing.

4. Apparatus of claim 1 wherein said fibers are carbon fibers.

5. Apparatus of claim 1 further comprising a sleeve having openings at each of its ends wherein said member fabricated from fibers is disposed in said sleeve.

6. Apparatus of claim 5 wherein said sleeve and said member can be torqued at least 120 degrees upon rotation of one of said heat pipes.

7. Apparatus of claim 1 wherein said first heat pipe is coaxial and thermally conductive with said member.

8. Apparatus of claim 7 wherein said second heat pipe is coaxial and thermally conductive with said member.

9. Apparatus of claim 6 wherein said sleeve is hollow and thin-walled.

10. Apparatus of claim 9 wherein said sleeve is fabricated from a polymer having a high modulus of elasticity.

11. Apparatus of claim 9 wherein said sleeve is fabricated from nylon.

12. Apparatus of claim 1 wherein said flexible member is fabricated from a pitch-fiber based high thermal conductivity woven fabric.

13. Apparatus of claim 1 wherein said first heat pipe is attached to said member using a thermally conductive material.

14. Apparatus of claim 13 wherein said thermally conductive material is solder.

15. Apparatus of claim 13 wherein said thermally conductive material is epoxy.

16. A computer, comprising a first portion of the computer, a second portion of the computer, and a flexible member having a longitudinal axis and fabricated from thermally conductive fibers for transferring heat from said first portion to said second portion, said member being torqued about member longitudinal axis upon moving one of said portions of the computer relative to the other portion of the computer.

17. A computer of claim 16 further comprising said second portion of the computer moving between a first position and a second position relative to said first portion of the computer and wherein said member is fabricated from conductive fibers and experiences torsion when said second portion moves between said first position and said second position.

18. A computer of claim 17 wherein said first portion is a base section and said second portion is a display section.

19. A computer of claim 18 wherein said first position is a closed position and said second position is an operating position.

20. A computer of claim 17 further comprising a first heat pipe, a second heat pipe, and said flexible member fabricated from thermally conductive fibers is attached between said first heat pipe and said second heat pipe.

21. A computer of claim 16 further comprising a heat generating electronic component wherein said flexible member is thermally conductively attached with said heat generating electronic component.

22. A computer of claim 21 wherein said electronic component is a microprocessor.

23. A computer of claim 21 wherein said first portion is a base section and said second portion is a display section.

24. A computer of claim 23 further comprising a thermally conductive tab positioned in said display section.

25. A computer of claim 24 further comprising a screen on one side of said display section and a back surface on the other side of said display section, said tab positioned between said screen and said back surface of said display section.

26. Method of transferring heat from a first portion of a computer to a second portion of a computer, where said second portion moves relative to said first portion, said method comprising the steps of:

moving said second portion of the computer relative to said first portion of the computer, torquing a member fabricated from thermally conductive fibers about the member longitudinal axis while moving said second portion relative to said first portion, and transferring heat from said first portion to said second portion through said member fabricated from conductive fibers.

27. Method of claim 26 further comprising the step of deforming a hollow thin-walled sleeve surrounding said member fabricated from thermally conductive fibers while torquing said member.

28. Method of claim 27 further comprising the step of returning said member to its memory position after torquing said member.

* * * * *